US012595200B2

(12) United States Patent
Flynn et al.

(10) Patent No.: US 12,595,200 B2
(45) Date of Patent: Apr. 7, 2026

(54) MOLTEN GLASS TRANSPORT SYSTEM

(71) Applicant: Owens-Brockway Glass Container Inc., Perrysburg, OH (US)

(72) Inventors: Robin L. Flynn, Waterville, OH (US); Stephen Graff, Maumee, OH (US); Jason Pickles, Adrian, MI (US); Thomas Kirkman, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 700 days.

(21) Appl. No.: 17/956,503

(22) Filed: Sep. 29, 2022

(65) Prior Publication Data

US 2023/0097028 A1 Mar. 30, 2023

Related U.S. Application Data

(60) Provisional application No. 63/251,011, filed on Sep. 30, 2021.

(51) Int. Cl.
*C03B 7/14* (2006.01)

(52) U.S. Cl.
CPC ..................................... *C03B 7/14* (2013.01)

(58) Field of Classification Search
None
See application file for complete search history.

(56) References Cited

U.S. PATENT DOCUMENTS

| | | | | |
|---|---|---|---|---|
| 1,657,640 | A | * | 1/1928 | Peiler ........................ C03B 7/14 |
| | | | | 65/304 |
| 1,853,002 | A | | 4/1932 | Howard |
| 4,391,620 | A | * | 7/1983 | Geisel ........................ C03B 7/16 |
| | | | | 65/170 |
| 4,571,149 | A | | 2/1986 | Soroka et al. |
| 4,890,241 | A | | 12/1989 | Hoffman et al. |
| 7,412,849 | B2 | | 8/2008 | Bonitz et al. |
| 8,056,364 | B2 | | 11/2011 | Sakai et al. |
| 2004/0182112 | A1 | * | 9/2004 | Hosoe ................. C03B 19/1055 |
| | | | | 65/29.21 |
| 2004/0237592 | A1 | | 12/2004 | Iguchi et al. |

(Continued)

FOREIGN PATENT DOCUMENTS

JP 2002348134 A 12/2002

OTHER PUBLICATIONS

Chile Informe Pericial (Expert Report), Application No. 202400814, Applicant: Owens-Brockway Glass Container Inc., Dated: Mar. 5, 2025.

(Continued)

*Primary Examiner* — Queenie S Dehghan

(57) ABSTRACT
A glass manufacturing system for charging a glass blank mold is disclosed. The glass manufacturing system, in accordance with one aspect of the disclosure, comprises a glass forming sub-system, including a blank mold having a blank mold loading axis; and a molten glass handling sub-system. The molten glass handling sub-system includes a glass feeder to feed molten glass along a feeder axis, a transport cup to receive molten glass along the feeder axis, and a movable carrier to support the transport cup and carry the transport cup away from the glass feeder and to the blank mold.

17 Claims, 7 Drawing Sheets

(56) References Cited

U.S. PATENT DOCUMENTS

| | | | | |
|---|---|---|---|---|
| 2009/0107180 A1* | 4/2009 | Sakai | .................... | C03B 19/02 |
| | | | | 65/182.2 |
| 2009/0107181 A1 | 4/2009 | Sakai | | |
| 2009/0255296 A1* | 10/2009 | Viada | .................. | G05B 19/042 |
| | | | | 65/29.11 |
| 2012/0011890 A1 | 1/2012 | Sakai et al. | | |

OTHER PUBLICATIONS

Chile Informe De Busqueda (Search Report), Application No. 202400814, Applicant: Owens-Brockway Glass Container Inc., Dated: Mar. 5, 2025.
Int. Search Report and Written Opinion, Int. Application No. PCT/US2022/045234, Int. Filing Date: Sep. 29, 2022, Applicant: Owens-Brockway Glass Container Inc., Mail Date: Jan. 13, 2023.
Chile Respuesta Pericial (Expert Response), Application No. 202400814, Applicant: Owens-Brockway Glass Container Inc., Dated: Jun. 17, 2025.
Chile Informe de Busqueda (Search Report), Application No. 202400814, Applicant: Owens-Brockway Glass Container Inc., Dated: Jun. 17, 2025.

* cited by examiner

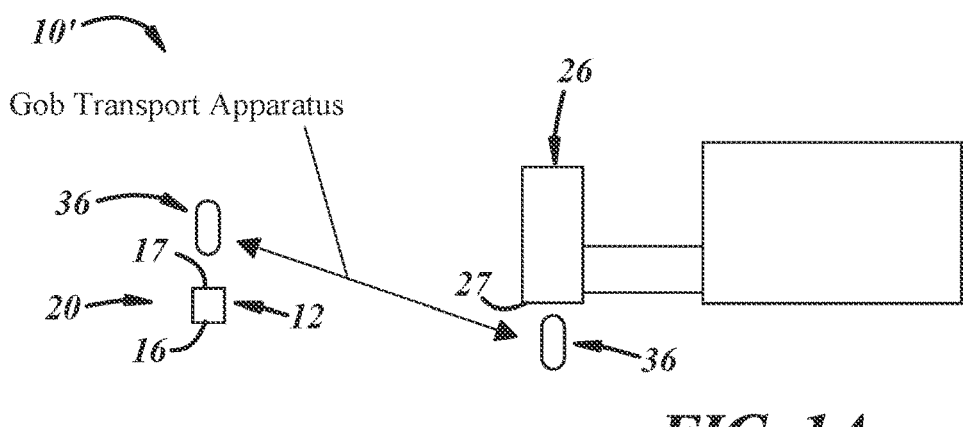
*FIG. 1A*
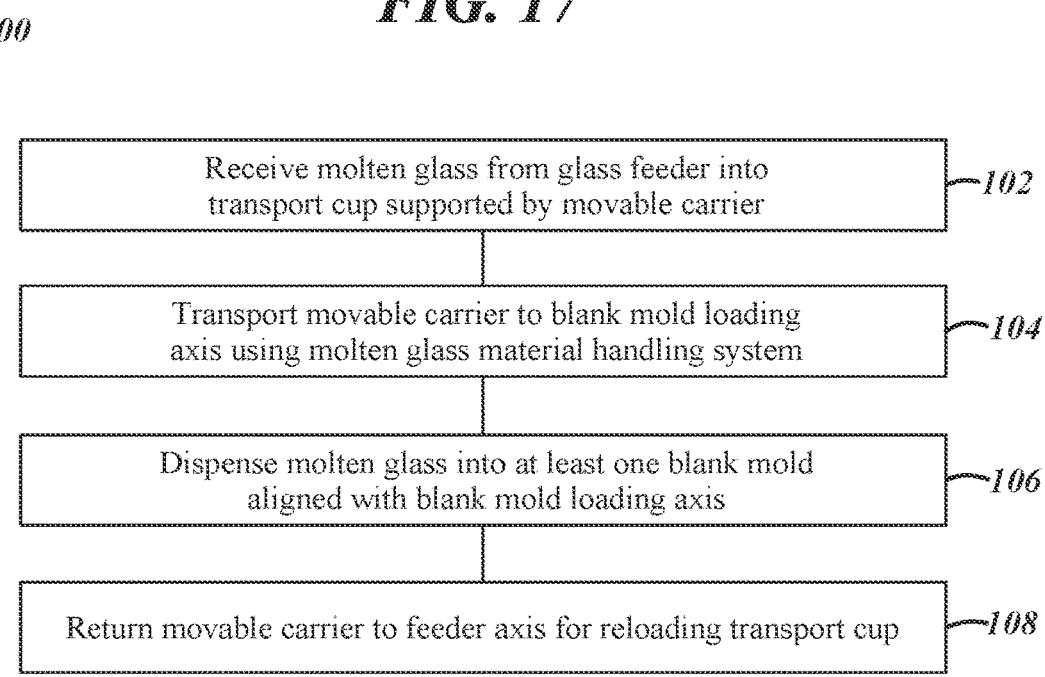
*FIG. 17*
*FIG. 18*

MOLTEN GLASS TRANSPORT SYSTEM

TECHNICAL FIELD

This disclosure relates generally to glass manufacturing and, more particularly, to the transportation of glass to forming machines that are configured to form the delivered glass into glass articles.

BACKGROUND

A conventional glass factory includes a multi-story, continuously-operated furnace and a batch charger that introduces a vitrifiable glass batch into the furnace. The furnace melts glass batch into molten glass and refines the molten glass. The conventional furnace includes a long, refractory-built tank elevated by a raised platform of the factory building and includes a melter section that melts the glass batch into molten glass. A forehearth is located downstream of the furnace. The forehearth receives molten glass from the furnace and cools the molten glass to a uniform temperature and viscosity suitable for downstream forming operations.

At the downstream end of the forehearth, a molten glass feeder receives molten glass from the forehearth, produces a flow of molten glass, and shears the flow of molten glass into gobs of a predetermined weight that freefall into gob handling equipment. The gob handling equipment typically includes a lengthy series of distributors, scoops, chutes, troughs, deflectors, and funnels. The gob handling equipment may also include ancillary lubrication equipment that lubricates the gob handling equipment, and liquid separators to separate the lubricants. Since a minimum angle is required to convey the glass gobs along the gob handling equipment, and in particular the chutes and troughs, the gob handling equipment can be relatively tall, often extending between ten and fourteen feet in height.

The gob handling equipment directs the glass gobs to chute-fed glass forming machines that form the gobs into finished glass articles such as hollow containers. Each of the forming machines includes a blank mold and a blow mold that are operated together. In the blank mold, a glass gob is pressed or blown into a partially-formed container or parison. The parison is then inverted, transferred to the blow mold, and blown against the internal walls of the blow mold into a finished container. While the conventional process of delivering molten glass into the blank molds of the forming machines is practical and workable, the equipment needed to perform that function is relatively tall, takes up considerable space, and has a tendency to deliver glass gobs with significantly varying characteristics—such as weight, temperature, and/or shape—to the blank molds.

SUMMARY OF THE DISCLOSURE

The present disclosure embodies a number of aspects that can be implemented separately from or in combination with each other.

A glass manufacturing system, in accordance with one aspect of the disclosure, comprises a glass forming sub-system and a molten glass handling sub-system. The glass forming sub-system includes a blank mold having a blank mold loading axis. The molten glass handling sub-system includes a glass feeder to feed molten glass along a feeder axis, a transport cup to receive molten glass along the feeder axis, and a movable carrier to support the transport cup and carry the transport cup away from the feeder axis to the blank mold loading axis.

A method for transporting molten glass, in accordance with one aspect of the disclosure, comprises the step of receiving molten glass from a glass feeder along a feeder axis into at least one transport cup, which is supported by a movable carrier. The method also includes the step of transporting the movable carrier to bring the transport cup over a blank mold having a blank mold loading axis, and dispensing the molten glass into the blank along the blank mold loading axis. Still further, the method includes the step of returning the movable carrier to the glass feeder for reloading the a transport cup.

BRIEF DESCRIPTION OF THE DRAWINGS

The disclosure, together with additional objects, features, advantages and aspects thereof, will be best understood from the following description, the appended claims and the accompanying drawings, in which:

FIG. 1A, on the second sheet of drawings, is a schematic, side elevational view of another glass manufacturing system that includes a glass forming sub-system having a glass feeder with an outlet at a first elevation and having a blank mold with a blank mold opening at a second elevation that is higher than the first elevation of the outlet of the glass feeder, wherein a gob transport apparatus transports molten glass upwardly from the relatively lower glass feeder outlet to the relatively higher blank mold opening;

Figures 1, 2, 3, 4:
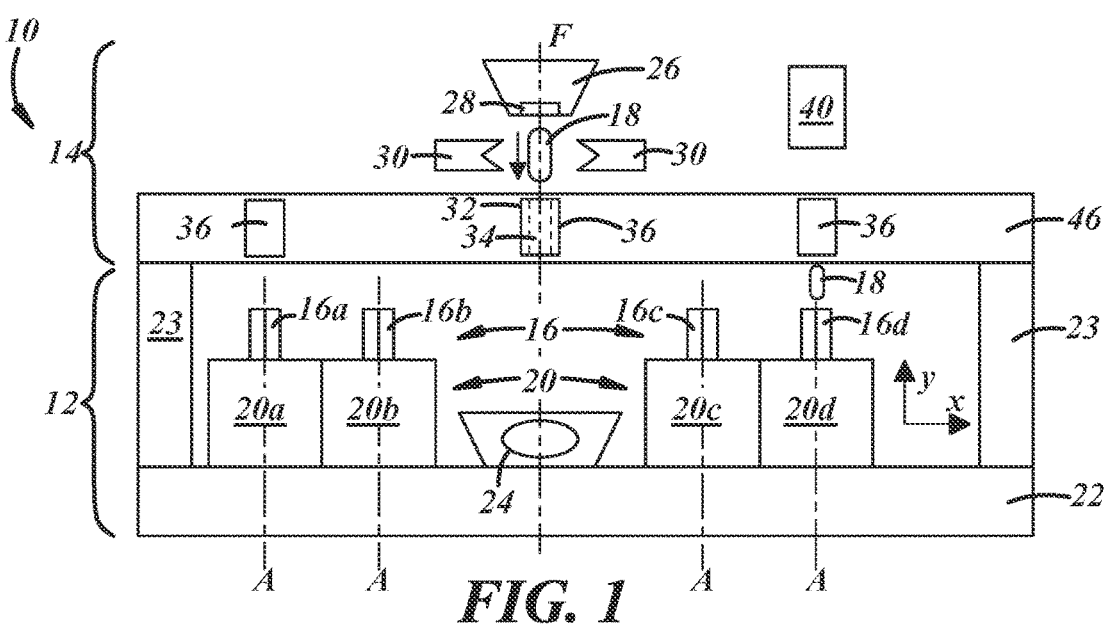
FIG. 1 is a schematic, side elevational view of a glass manufacturing system in which molten glass is transported using a movable carrier, in accordance with an illustrative embodiment of the present disclosure.
FIG. 2 is a schematic, plan view of multiple movable carriers coupled to a gantry and included in the glass manufacturing system illustrated in FIG. 1, according to an illustrative embodiment of the present disclosure.
FIG. 3 is a schematic, cross-sectional view of a cup treatment device with a multipart cup opener that may be included in the glass manufacturing system shown in FIG. 1, according to an illustrative embodiment of the present disclosure.
FIG. 4 is a schematic, cross-sectional view of a cup treatment device with a single piece cup opener that may be included in the glass manufacturing system shown in FIG. 1, according to an illustrative embodiment of the present disclosure.
Figures 5, 6, 7:
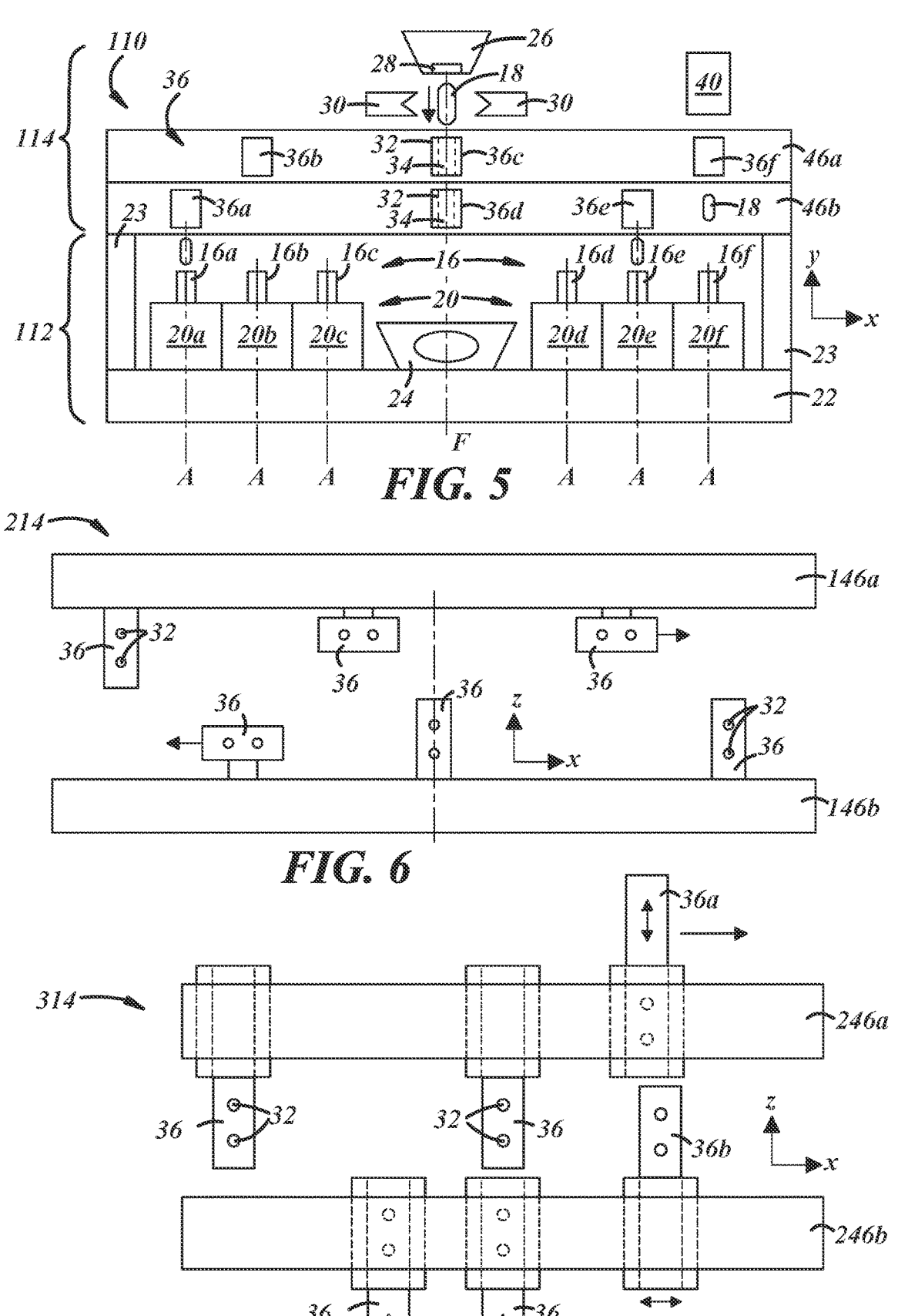
FIG. 5 is a schematic, side elevational view of a glass manufacturing system for transporting molten glass using a movable carrier, in which the system includes multiple gantries, according to an illustrative embodiment of the present disclosure.
FIG. 6 is a schematic, plan view of a molten glass handling sub-system including pivotable and translatable carriers that may be included in the glass manufacturing systems shown in FIGS. 1 and 5, according to an illustrative embodiment of the present disclosure.
FIG. 7 is a schematic, plan view of a molten glass handling sub-system including translatable carriers that may be included in the glass manufacturing systems shown in FIGS. 1 and 5, according to an illustrative embodiment of the present disclosure.
Figures 8, 9, 10:
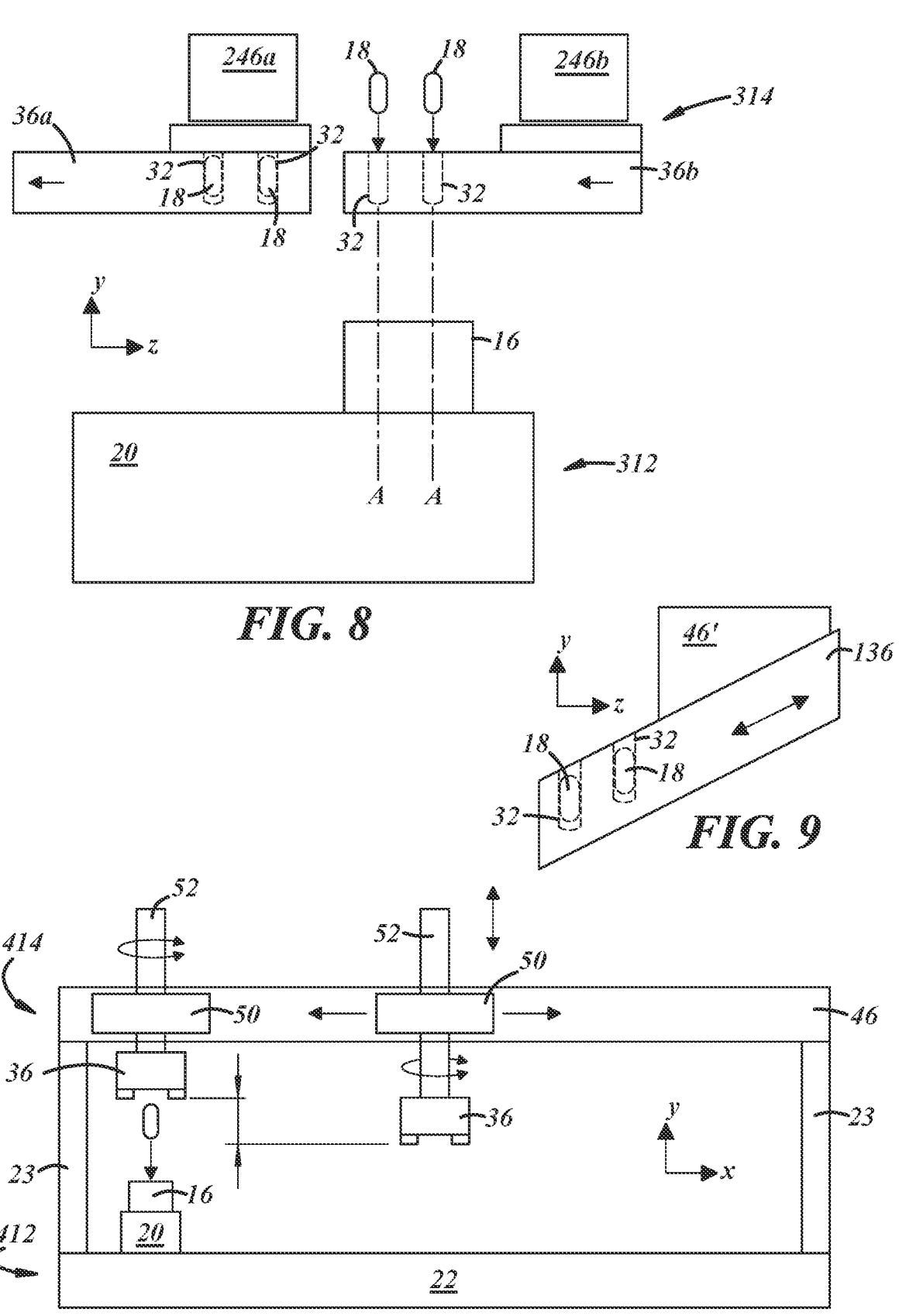
FIG. 8 is a schematic, end elevational view of the molten glass handling sub-system including translatable movable carriers as shown in FIG. 7, according to an illustrative embodiment of the present disclosure.
FIG. 9 is a schematic, side elevational view of an inclined translatable carrier that can be used in the molten glass handling sub-system shown in FIG. 1 and/or FIG. 1A, according to an illustrative embodiment of the present disclosure.
Figures 11, 12:
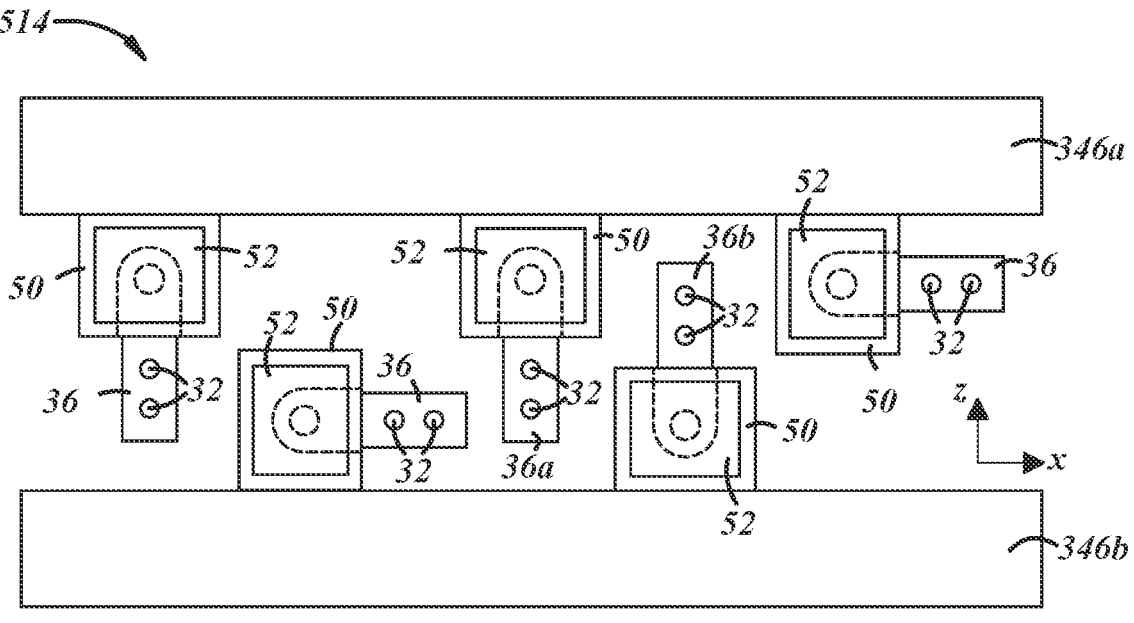
Figure 13:
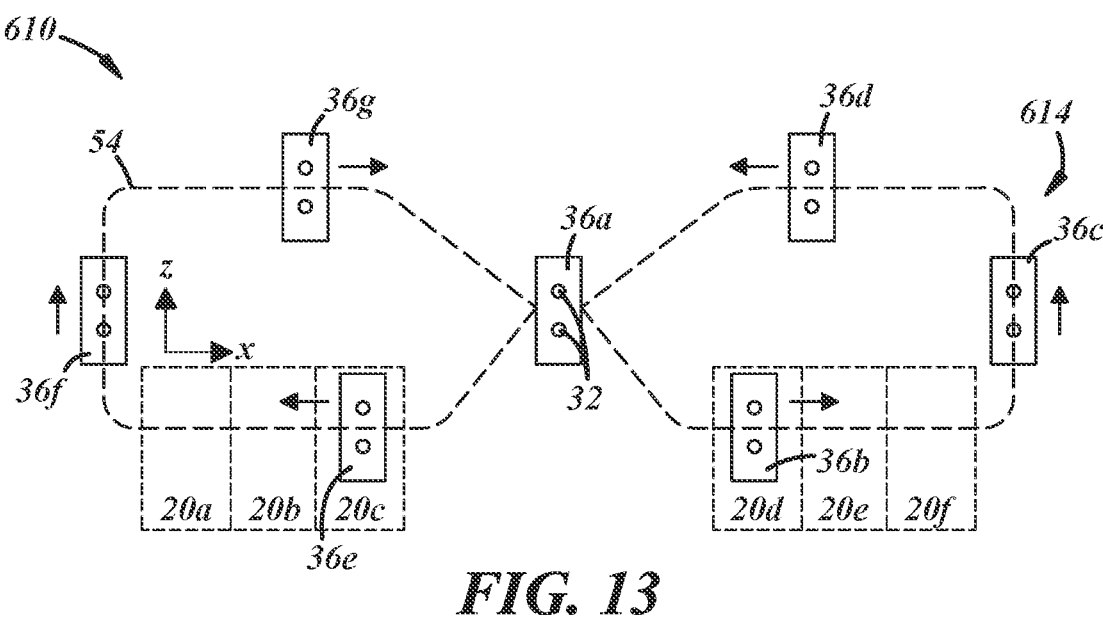
Figure 14:
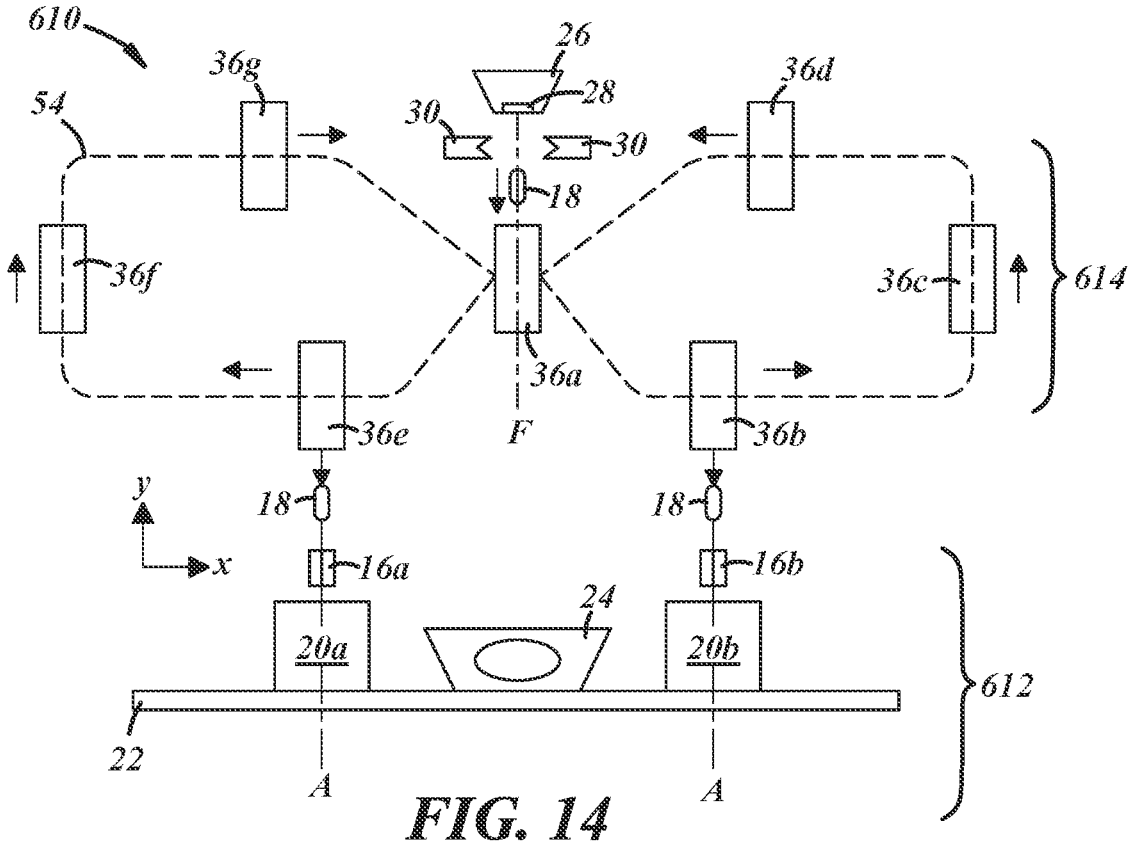
Figure 16:
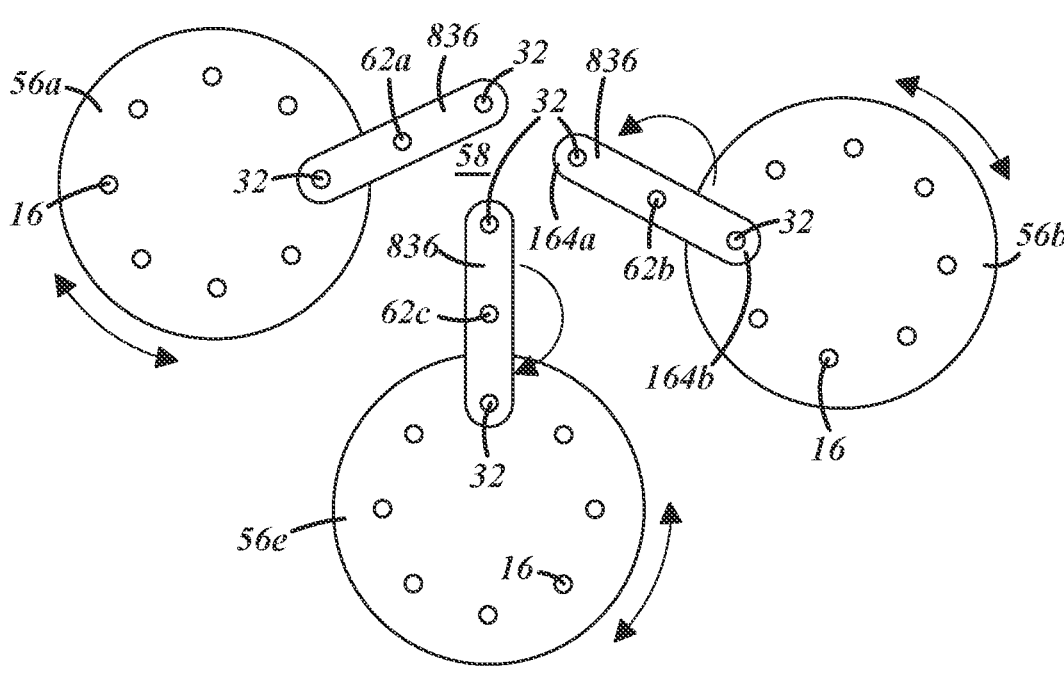
Figure 15:
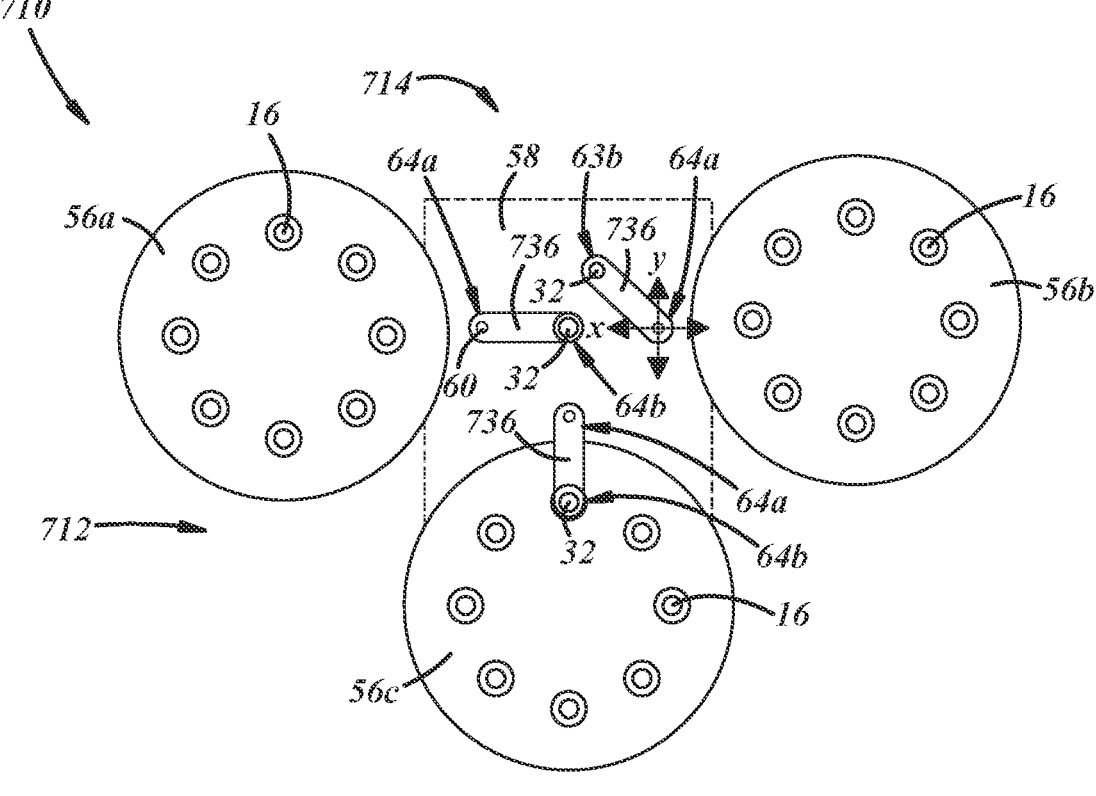

FIG. 10 is a schematic, side elevational view of a molten glass handling sub-system including rotatable and horizontally and vertically translatable carriers that may be included in the glass manufacturing systems shown in FIGS. 1 and 5, according to an illustrative embodiment of the present disclosure;

FIG. 11 is a schematic, plan view of a molten glass handling sub-system including rotatable and horizontally and vertically translatable carriers, according to an illustrative embodiment of the present disclosure;

FIG. 12 is a schematic, side elevational view of the molten glass handling sub-system of FIG. 11, according to an illustrative embodiment of the present disclosure;

FIG. 13 is a schematic, plan view of a molten glass handling sub-system establishing a first dedicated carrier path in a first plane, according to an illustrative embodiment of the present disclosure;

FIG. 14 is a schematic, side elevational view of the molten glass handling sub-system of FIG. 13, establishing a second dedicated carrier path in a second plane, according to an illustrative embodiment of the present disclosure;

FIG. 15 is a schematic, plan view of a plurality of rotary carriers having pivots on first ends and transport cups on second ends, and that are interdigitated with one another and that transport molten glass to a plurality of rotary blank mold carriers, in accordance with an illustrative embodiment of the present disclosure;

FIG. 16 is a schematic plan view of a plurality of rotary carriers and a plurality of rotary blank mold carriers, where the rotary blank mold carriers include a central pivot and transport cups on opposite ends, in accordance with an illustrative embodiment of the present disclosure;

FIG. 17 is a diagrammatic view illustrating a glass manufacturing system including a controller, in accordance with an illustrative embodiment of the present disclosure; and FIG. 18 is a flow diagram showing various steps of an illustrative embodiment of a method for transporting molten glass using the glass manufacturing system shown in FIGS. 1 through 17.

DETAILED DESCRIPTION

In contrast to conventional glass gob handling, the system and method disclosed herein can reduce the height differential between an outlet of a molten glass feeder and an opening of a blank mold of a glass forming machine and can improve the accuracy at which molten glass is charged into the blank mold. Also, the system may occupy an operational envelope that is much smaller than that of conventional gob handling systems. In contrast to a large positive vertical height differential (about ten to fourteen feet) between a glass feeder and the forming machine as required by conventional systems, the presently disclosed system may occupy no more than two feet (positive or negative) of vertical height to deliver molten glass from the glass feeder and into the blank mold of a downstream forming machine. And because of the reduced height of the system, molten glass does not suffer from unequal cooling, damage, or deformity prior to being delivered to the glass forming machine—a potential quality issue often attributed to significant contact with lubricant and lengthy gob handling equipment. In fact, in the presently disclosed system, the molten glass delivered to the forming machine has relatively improved thermal homogeneity. This tends to result in fewer commercial variations in the formed glass articles and, in the context of glass containers, a more consistent container wall thickness. A more consistent container wall thickness, in turn, allows the container to be formed with a thinner wall, which reduces the weight of the container and shortens annealing time since the container is formed from a lesser volume of glass.

The present disclosure is directed to a glass manufacturing system and method to transport molten glass. The glass manufacturing system includes a molten glass handling sub-system, which transports molten glass to a glass forming sub-system and comprises at least one movable carrier having at least one transport cup. In the disclosed system, much, if not all, of the conventional gob handling equipment can be eliminated. Therefore, the system can provide a lower glass line or metal line (i.e. level/elevation of molten glass in the forehearth as measured, for example, from the glass forming floor of the glass plant). A metal line of a conventional glass manufacturing system is about six to seven meters. In contrast, a metal line achievable with the present disclosure may be on the order of three to four meters. In any event, the lower glass line is achievable because lengthy and widespread conventional delivery equipment, with its minimum delivery angle and corresponding lengthy height requirement, can be omitted.

Additionally, the force needed to transport a quantity of molten glass from the glass feeder to the blank mold of the forming machine can be provided or augmented by the movable carrier(s). For example, the movable carrier(s) can provide enough potential energy (e.g., by transporting upwardly) and/or kinetic energy (e.g., using a blast of air) to load molten glass into the blank mold. By delivering the quantity of molten glass via the movable carrier and corresponding transport cup, loading accuracy can be significantly improved and, likewise, the load velocity requirements can be improved over those of conventional equipment (typically in the range of 5-7 m/s). Additionally, the elimination of much, if not all, of the conventional gob handling equipment can help minimize uneven cooling of the molten glass as it travels from the glass feeder to the blank mold of the glass forming machine.

Moreover, the presently disclosed system and method can facilitate use of a submerged combustion melting (SCM) furnace. Unlike a conventional Siemens-style glass furnace, an SCM furnace does not need to be supported on a raised platform above a factory floor and, instead, can be mounted on the factory floor. In such cases, a reduction in the height differential between an outlet of the glass feeder and the opening of the blank mold is made possible by the movable carrier(s). Accordingly, additional height would not have to be built into the system to accommodate conventional gravity-based gob transport. In fact, the presently disclosed system and method can receive molten glass from a relatively low outlet of the glass feeder associated with an SCM furnace and deliver a quantity of molten glass to a relatively higher opening of a blank mold.

With specific reference now to FIG. 1, a glass manufacturing system 10 is shown schematically in accordance with an illustrative embodiment of the present disclosure. The glass manufacturing system 10 comprises a glass forming sub-system 12 and a molten glass handling sub-system 14. The molten glass handling sub-system 14 receives molten glass from a furnace, forehearth, or other glass-containing vessel, and transports discrete portions of molten glass 18 to the glass forming sub-system 12. The term "discrete portion of molten glass" encompasses any defined quantity of molten glass including a molten glass gob, gather, distribution from a continuous stream, chunk, or charge.

The glass forming sub-system 12 includes one or more forming machines 20 (e.g., 20a, 20b, 20c, 20d), each of which includes at least one blank mold. The forming machine 20 may include a blank mold 16 (e.g., 16a, 16b, 16c, 16d), which receives one of the discrete portions of molten glass 18 at a time from the molten glass handling sub-system 14 and forms the portion of glass 18 into a parison, and a blow mold (not shown), which receives the parison from the blank mold 16 and forms the parison into a finished glass article. An opening of the blank mold 16 of each forming machine 20 may be horizontally aligned with the outlet of a glass feeder 26 that produces the discrete portion of molten glass 18, or it may be vertically displaced above or below the outlet of the glass feeder 26.

The opening of the blank mold 16 of each forming machine 20 is centered about a respective blank mold loading axis A. The molten glass handling sub-system 14 is configured to deliver one of the molten glass portions 18 into each of the blank molds 16 along the blank mold loading axis A at a time. The blank mold loading axis A of each blank mold 16 may be vertical (i.e., oriented parallel to gravity) or it may be oriented at an angle from vertical.

Each blank mold 16 is configured to shape and mold the molten glass portion 18 received therein into a glass parison, which is basically a partially-formed glass container, or some other preform shape. As is shown illustratively in FIG. 1, each blank mold 16 may be a component of the forming machine 20, which may be an individual section of an individual section (IS) machine. The forming machines 20 (20a, 20b, 20c, 20d) can be disposed on and/or coupled to a machine bed 22. In the illustrated embodiment, the molten glass handling sub-system 14 is coupled to the machine bed 22 using side frames 23. In other embodiments, however, the molten glass handling sub-system 14 may be supported by a factory floor independent of the machine bed 22.

The glass forming sub-system 12 may also include a cullet reject system 24 for removing cullet and broken glass from the machine bed 22 and the forming machines 20. The cullet reject system 24 may be disposed on and/or coupled to the machine bed 22 and may include a sensor (not shown) for sensing cullet and a pneumatic blower (not shown) for blowing and removing the cullet. Additionally, the cullet reject system 24 may be used for disposing of molten glass that is not properly loaded into the glass manufacturing system 10.

The molten glass handling sub-system 14 includes the glass feeder 26, which fluidly communicates with the upstream glass-containing vessel, such as a furnace or forehearth, and fashions molten glass received from the glass-containing vessel into the discrete portions of molten glass 18. The outlet of the glass feeder 26 is centered about a feeder axis F along which the discrete portions of molten glass 18 are delivered from the feeder 26 and fed into the blank mold 16 of the forming machine(s) 20 of the glass forming sub-system 12 along the blank mold loading axis A. The feeder axis F may be aligned vertically and with gravity. The glass feeder 26 may be constructed in any suitable way. In one particular example, the glass feeder 26 may include a bowl that contains a bottom orifice plate and a reciprocal plunger disposed within the bowl for controllably discharging a stream of molten glass through an orifice 28 defined in the orifice plate. The glass feeder 26 may also include one or more shearing blades 30 located external to and underneath the bowl for shearing the discharged stream of molten glass into the individual discrete portions of molten glass 18.

In this example, the orifice 28 constitutes the outlet of the glass feeder, and more than one orifice 28 may be defined in the orifice plate, thus providing the glass feeder 26 with more than one outlet.

In addition to the glass feeder 26, the molten glass handling sub-system 14 includes at least one movable carrier 36 to carry at least one transport cup 32. As shown in FIG. 1, the glass feeder 26 feeds one of the discrete molten glass portions 18 to each of the transport cups 32. In the illustrated embodiment, the transport cup 32 receiving the molten glass portion 18 is located below the outlet of the glass feeder 26. In other embodiments, the transport cup 32 may be located laterally adjacent to or even above the outlet of the glass feeder 26. The transport cup 32 defines a cavity 34 configured to contain one of the molten glass portions 18 dispensed from the glass feeder 26 at a time for transport to the glass forming sub-system 12, preferably on a cushion of air to prevent heat transfer from the portion of molten glass 18 to the cup 32. The cavity 34 of the transport cup 32 may be constructed of or established by one or more heat resistant materials such as, for example, boron nitride, aluminum nitride, silicon carbide, beryllium oxide, platinum, graphite, graphene, or combinations thereof.

The transport cup 32 is supported by the movable carrier 36. The movable carrier 36 is configured to carry the transport cup 32 back-and-forth between the glass feeder 26 and the forming machines 20 of the glass forming sub-system 12, as is further explained below. Specifically, after the transport cup 32 receives one of the discrete portions of molten glass 18, the movable carrier 36 with its transport cup(s) 32 is carried away from the glass feeder 26 and to the glass forming sub-system 12 where the discrete portion of molten glass carried by the cup 32 is fed into the blank mold 16 of one of the forming machines 20 along the blank mold loading axis A. After the discrete portion of molten glass 18 is delivered by the transport cup 32, the movable carrier 36 and its associated transport cup(s) 32 is returned to the glass feeder 26 so that the cup 32 can receive another portion of molten glass 18.

The movable carrier 36 can support one or a plurality of transport cups 32. Referring now to FIG. 2, for example, various embodiments of the movable carrier 36 are illustrated, including a one transport cup carrier 36-1, a two transport cup carrier 36-2, a three transport cup carrier 36-3, and a four transport cup carrier 36-4. It will be appreciated that each movable carrier 36 can support and carry any number of transport cups 32 and that the molten glass handling sub-system 14 may include one to four carriers 36, as illustrated, or any suitable number of movable carriers 36.

A few preferred configurations of the transport cup 32 are shown in more detail in FIGS. 3-4. There, as shown, each transport cup 32 supported by the movable carrier 36 is configured to be opened and closed to dispense and receive one of the discrete portions of molten glass 18 (FIG. 1), respectively. In the embodiment shown in FIG. 3, the transport cup 32 includes a sleeve 31 having an open upper end to receive the portion of molten glass 18, and a cup opener 33 disposed under the sleeve 31 that is configured to retain the portion of molten glass 18 in the cup and to release the portion of molten glass 18 from the cup 32. The sleeve 31 and the cup opener 33 carry the heat-resistant materials that define the cavity 34 of the transport cup 32. In the embodiment shown in FIG. 3, the cup opener 33 includes multiple opposed parts (e.g., two halves) that separate by sliding or swinging in opposite directions to open to release the portion of molten glass portion 18 from the sleeve 31. In the embodiment shown in FIG. 4, however, the cup opener 33' of the transport cup 32 is one continuous piece that can slide, pivot, swing, drop down, or otherwise move relative to the sleeve 31 to release the portion of molten glass 18 from the sleeve 31. Other transport cup configurations besides those shown in FIGS. 3-4 are certainly possible including those that can be rotated or flipped over to release the portion of molten glass 18.

The transport cup 32 may be fluid-cooled. For example, in some instances, the movable carrier 36 may support a cooling device 38 configured to provide a cooling fluid (air or liquid) to the movable carrier 36 and/or the at least one transport cup 32. The cooling device 38 may include an air-based cooling device (e.g., a fan), a liquid-based cooling device (e.g., a heat exchange device brings a coolant into thermal communication with the transport cup 32), and/or an electricity-based device (e.g., a Peltier device). Coincidentally, the cooling fluid may include air, water, an antifreeze mixture, and/or the like.

Additionally, if multiple transport cups 32 are supported by the movable carrier 36, the transport cups 32 can be translated laterally with respect to one another, e.g., by any suitable pneumatic, hydraulic, and/or electromechanical device(s) to meet center distance requirements for the forming machine 20. Indeed, for conventional feeders, orifice center distances are not the same as blank mold center distances; thus, each transport cup 32 can be moved laterally with respect to one or more of the other transport cups 32 in an accordion-like manner to match center distances at the orifice 28 and at the forming machine 20. For example, although not separately illustrated, one or more pneumatic cylinders or actuators can be operatively coupled between multiple transport cups 32 to pull the cups 32 toward one another to narrow the center distances therebetween to receive glass charges therein and to push the cups 32 away from one another to widen the center distances therebetween to dispense glass charges therefrom. In other embodiments, hydraulic or electromechanical actuators can be used instead of pneumatic actuators.

Still referring to FIGS. 3-4, the molten glass handling sub-system 14 may further include a cup treatment device 40 that provides a surface treatment to the transport cup 32. The surface treatment may include an ABL process for sooting, a suspended graphite mixture, and/or a colored frit for decoration. For example, while the movable carrier 36 is staged near the glass feeder 26 awaiting receipt one of the portions of molten glass 18, the cup treatment device 40 can provide a surface treatment to the inside surfaces of the transport cup 32 to facilitate the efficient release of the portion of molten glass 18, to inhibit heat transfer from the portion of molten glass 18 to the cup 32, or to help improve the surface strength of the glass, or for decoration. The cup treatment device 40 may include a treatment applicator 42 for providing the surface treatment material and a nozzle 44 coupled to the treatment applicator 42 for directing and exposing the surface treatment material to the transport cup 32. In the embodiments shown in FIGS. 3-4, the nozzle 44 may be inserted into the transport cup 32 before the molten glass portion 18 is loaded and can dispense the surface treatment material onto the inside surfaces of the transport cup 32.

Referring back to FIG. 1, the molten glass handling sub-system 14 includes at least one gantry 46 that supports and carries the movable carrier(s) 36 between the glass feeder 26 and the blank mold(s) 16 of the forming machine(s) 20. The gantry 46 of the illustrated embodiments is an overhead gantry but those of ordinary skill in the art would recognize that a floor level gantry or an intermediate level gantry could be used. As such, the term "gantry" is used herein to include, for example, a ceiling-mounted or a floor-mounted apparatus having one or more rails along which one or more carriages may ride wherein the carriages may have sub-carriages with sub-rails extending transversely with respect to the other rails and along which one more sub-carriages may ride, and wherein the carriages and/or sub-carriages may carry the movable carrier(s) 36. FIG. 1 illustrates a single gantry 46 and three movable carriers 36.

The gantry 46 may extend along the length of the glassware manufacturing system 10 and includes one or more pneumatic, hydraulic, and/or electromechanical actuators, motors, linear drives, servo drives, solenoids, pistons/cylinders, etc. that also may include belts, chains, cables, ball screws, and/or any number of other devices for moving the movable carriers 36. The gantry 46 and the movable carrier(s) 36 with associated transport cup(s) 32 can replace the existing overhead structure on a conventional forming machine, eliminate the conventional delivery system, and lower the metal line. In this embodiment, the movable carriers 36 can be shuttled back-and-forth across the gantry 46 to deliver the portions of molten glass 18 carried within the transport cup(s) 32 from the glass feeder 26 to respective blank molds 16. The movable carrier(s) 36 can be transported along the gantry 46 in any desired route to deliver portions of molten glass 18 from the glass feeder 26 to the glass forming machine(s) 20, and back, since the travel path of the carrier(s) 36 and the associated transport cup(s) 32 is not required to be driven exclusively by gravity. Of course, the carriers 36 can be moved independently with respect to one another.

More than one gantry 46 may be included in the molten glass handling sub-system. To be sure, when the glass forming sub-system includes multiple forming machines 20, a situation may arise where one movable carrier 36 would need to pass another movable carrier 36 on the single gantry in order to feed the portions of molten glass 18 to all of the blank molds 16 in accordance with the different firing orders of the blank molds 16. For example, a movable carrier 36 returning to the glass feeder 26 would not be able to arrive at the glass feeder 26 and be located under the orifice 28 in alignment with the feeder axis F to receive another portion of molten glass 18 when another movable carrier 36 in front of it on the travel path of the gantry 46 is delivering a portion of molten glass 18 to another blank mold 16 on the same side of the glass forming sub-system 12. In these instances, and with reference to FIG. 5, the molten glass handling sub-system, which is designated here by reference numeral 114, may include multiple gantries 46a, 46b that carry one or more movable carriers 36 having at least one transport cup 32 as described above.

In the embodiment illustrated in FIG. 5, the molten glass handling sub-system 114 includes first and second vertically adjacent gantries 46a, 46b, although it will be appreciated that the gantries 46a, 46b can be horizontally adjacent, instead of vertically adjacent, and that more than two gantries may be implemented. Here, the first gantry 46a is located above the second gantry 46b, with the first gantry 46a supporting a plurality of movable carriers 36c, 36b, 36f and the second gantry 46b also supporting a plurality of movable carriers 36d, 36a, 36e. More specifically, a first movable carrier 36c is supported on the first gantry 46a and a second movable carrier 36d supported on the second gantry 46b. A transport cup 32 supported by the first movable gantry is positioned under the glass feeder 26 in alignment with the feeder axis F of the glass feeder 26 and is available for receiving a discrete portion of molten glass 18. Similarly, a transport cup 32 supported by the second movable carrier 36*d* is also positioned under the glass feeder 26 in alignment with the feeder axis F of the glass feeder 26, but below the transport cup 32 of the first movable glass feeder 36*c*, and is available for receiving a discrete portion of molten glass 18 once the transport cup 32 of the first movable carrier 36*c* is loaded and moved out of the way.

In operation, the transport cup 32 of the first movable carrier 36*c* receives a discrete portion of molten glass 18 and is then transported via the first movable carrier 36*c* away from the glass feeder 26 in a direction on the first gantry 46*a*. This makes the transport cup 32 of the second movable carrier 36*d* available to receive a discrete portion of molten glass 18. Once the transport cup 32 of the second movable carrier 36*d* receives a discrete molten glass portion 18 and is moved away from the glass feeder 26 in a direction on the second gantry 46*b*, a third movable carrier 36*b* on the first gantry 46*a* is moved in the same direction as the first movable carrier 36*c* to position an associated transport cup 32 under the glass feeder 26 in alignment with the feeder axis F of the glass feeder 26, making the cup 32 available for receiving a discrete portion of molten glass 18, and a fourth movable carrier 36*a* on the second gantry is moved in the same direction as the second movable carrier 36*d* to position an associated transport cup 32 under the transport cup 32 of the third movable carrier 36*b* as before, and so forth. In this embodiment, each gantry 46*a*, 46*b* can include at least three movable carriers 36 and can move the carriers 36 back and forth from the feeder axis F to respective blank mold loading axes A on opposite sides of each gantry 46*a*, 46*b* along a horizontal x-axis.

FIG. 1A, on the second sheet of drawings, illustrates another illustrative embodiment of a glass manufacturing system 10'. This embodiment is similar in many respects to the embodiment of FIG. 1 and like numerals between the embodiments generally designate like or corresponding elements throughout the several views of the drawing figures. Accordingly, the descriptions of the various embodiments of the present disclosure are hereby incorporated into one another, and description of subject matter common to the embodiments generally may not be repeated. The glass manufacturing system 10' includes the previously described glass forming sub-system 12, but, here, the blank mold(s) 16 of the glass forming sub-system 12 have blank mold openings 17 at a higher elevation than the outlet 27 of the glass feeder 26 of the previously described molten glass handling sub-system 14. The blank mold openings 17 may be higher than, or elevated vertically with respect to gravity, with respect to the outlet 27 of the glass feeder 26 by one to three feet, including all ranges, sub-ranges, endpoints, and values in that range. The glass handling sub-system 14 shown here includes the previously described movable carrier(s) 36 that can be moved back and forth from the glass feeder 26 to the blank mold(s) 16.

Turning now to FIG. 6, certain methods may utilize a loop path for each movable carrier 36 or may require the movable carriers 36 to be manipulated during transport so that supply movable carriers 36 (those carrying a discrete portion of molten glass 18 to the glass forming sub-system 12) can pass by return movable carriers 36 (those not carrying a discrete portion of molten glass 18 and returning to the glass feeder 26) on the same side or end of the glass manufacturing system 10. One configuration of a molten glass handling sub-system 214 can include using at least one pivotably movable carrier 36. As shown here, a first gantry 146*a* and a second gantry 146*b* positioned proximate and parallel to each other are illustrated, and each gantry 146*a*, 146*b* can be positioned over a plurality of forming machines (not shown). Each gantry 146*a*, 146*b* includes a plurality of the pivotably movable carriers 36, each of which is pivotable or rotatable in a rotation plane thus allowing each carrier 36 to rotate toward (e.g., parallel with) and away from (e.g., perpendicular to) its respective gantry 146*a*, 146*b*. Additionally, the pivotably movable carriers 36 may be rotatable about their own longitudinal axes, allowing each of the carriers 36 to flip over 180 degrees and dispense portions of molten glass 18 from its corresponding transport cup(s) 32 into blank molds 16 below.

The pivotably movable carriers 36 permit the carriers 36 to be moved past each other on the separate gantries 146*a*, 146*b* without interference. When a portion of molten glass 18 is being received in the transport cup(s) 32 of each carrier 36, the movable carrier 36 may be pivoted away (e.g., extended) from its respective gantry 146*a*, 146*b*. After the transport cup(s) 32 of the movable carrier 36 is loaded, the movable carrier 36 may be pivoted toward (e.g., retracted) its respective gantry 146*a*, 146*b* and then transported along its respective gantry from the feeder axis F of the glass feeder 26 to blank mold loading axes A for unloading the molten glass portion 18 into the corresponding blank mold 16, and then back to the glass feeder where the carrier 36 is again pivoted away from its respective gantry 146*a*, 146*b* for loading.

Turning now to FIGS. 7-8, another embodiment of a molten glass handling sub-system 314 is illustrated. The movable carriers 36 of this molten glass handling sub-system 314 are translatable. In each of FIGS. 7 and 8, a first gantry 246*a* and a second gantry 246*b* positioned side-by-side (e.g., laterally adjacent) and parallel to each other are illustrated. Each gantry 246*a*, 246*b* can be positioned over the glass forming sub-system 312 and a plurality of forming machines 20 as before and includes a plurality of the translatable movable carriers 36. Each of the translatable movable carriers 36 is translatable (x-axis) along its respective gantry 246*a*, 246*b* and can also slide reciprocally to retract the transport cup(s) 32 toward (e.g., into the z-axis, retracted) and extend the transport cup(s) 32 away from (e.g., out of the z-axis, extended) its respective gantry 246*a*, 246*b* perpendicular to the translation motion.

When loading the transport cup(s) 32 of each translatable movable carrier 36, the carrier 36 is slid away or extended away from its respective gantry 246*a*, 246*b* to bring the transport cup(s) 32 into alignment with the feeder axis F of the glass feeder 26 and, thus, make the transport cup 32 available for receiving a portion of molten glass 18. After the transport cup(s) 32 associated with the movable carrier 36 is loaded, the carrier 32 is slid into or retracted into its respective gantry 246*a*, 246*b*. The translatable movable carrier 32 is then transported along its respective gantry 246*a*, 246*b* to a blank mold 16 of a forming machine 20. When unloading the transport cup(s) 32 of each translatable movable carrier 36 at the blank mold 16, the carrier 36 is slid away or extended away from its respective gantry 246*a*, 246*b* once again, but this time aligns the transport cup 32 with the blank mold loading axis A of the blank mold 16. After the discrete portion of molten glass 18 is delivered to the blank mold 16, the translatable movable carrier 36 is again slid or retracted back toward its respective gantry 246*a*, 246*b* and returned to the glass feeder 26.

The sliding retraction and extension of the translatable movable carriers 36 as described above permits the carriers 36 on the two gantries 246*a*, 246*b* to be carried between the glass feeder 26 and the forming machines 20 while maintaining clearance so that the carriers 36 on the gantries 246*a*, 246*b* can move past each other without interfering with each other for efficient transport of the portions of molten glass 18. In FIG. 7, one translatable movable carrier 36 is shown being loaded (top middle), two translatable movable carriers 36 are shown being unloaded (top left and bottom right), and three translatable movable carriers 36 are shown in transit (top right, bottom middle, and bottom left). In FIG. 8, the translatable movable carrier 36*a* supported by the first gantry 246*a* is shown retracted for transit while the translatable movable carrier 36*b* supported by the second gantry 246*b* is shown extended for loading or unloading of a portion of molten glass 18.

Turning now to FIG. 9, another embodiment of a movable carrier 136 is shown. The inclined translatable movable carrier 136 shown here is similar to the translatable movable carrier 36 shown in FIGS. 7 and 8 although, in this embodiment, the carrier 136 is inclined relative to the horizontal. The inclined translatable movable carrier 136 can slide reciprocally (angled into the y-z plane) to extend the transport cup(s) 32 away from and retract the transport cup(s) 32 towards the gantry 46' at an angle relative to the horizontal while the carrier 36 translates along the gantry 46' (x-axis). For example, a linear transport device, such as a rack and pinion, may be coupled to the gantry 46' and configured to slidingly retract and extend the movable carrier 136 to provide clearance from other movable carriers 136. When being loaded with a discrete portion of molten glass 18, the inclined translatable movable carrier 136 is slid away or extended away from its respective gantry 46' at incline to bring the transport cup(s) 32 into alignment with the feeder axis F of the glass feeder 26 and, thus, make the transport cup 32 available for receiving a portion of molten glass 18. After the transport cup(s) 32 associated with the inclined translatable movable carrier 136 is loaded, the carrier 136 is slid or retracted back toward its respective gantry 46'. The inclined translatable movable carrier 136 is then transported along the gantry 46' to a blank mold 16 of a forming machine 20. When unloading the transport cup(s) 32, the inclined translatable movable carrier 136 is slid away or extended away from the gantry 46' once again, but this time align the transport cup 32 with the blank mold loading axis A of the blank mold 16. After the discrete portion of molten glass 18 is delivered to the blank mold 16, the inclined translatable movable carrier 136 is again slid or retracted back toward the gantry 46' and returned to the glass feeder 26.

Turning now to FIG. 10, a molten glass handling sub-system 414 is illustrated that includes one or more movable carriers 36 configured to be horizontally translatable, rotatable, and vertically translatable. The movable carriers 36 shown here may be coupled to corresponding rotary mechanisms 50 mounted on a gantry 46 and to corresponding Y-drives 52. The rotary mechanisms 50 rotate their respective movable carriers 36 (about the y-axis) in either rotational direction, and the Y-drives 52 vertically translate the carriers 52 (along the y-axis) to either extend the carriers 32 away from or retract the carriers 32 towards the gantry 46. For example, each movable carrier 36 and its associated transport cup(s) 32 may be rotated by the rotary mechanism 50 and extended away from the gantry 46 to position the transport cup(s) 32 at a first position for loading of a portion of molten glass 18. After the transport cup(s) 32 have been loaded with molten glass portions 18, the movable carrier 36 may be rotated by the rotary mechanism 50 and retracted toward the gantry 46 to position the transport cup(s) 32 at a second position for transport to the forming machine(s) 20 and delivery of the portion of molten glass 18 into a blank mold 16 along the blank mold loading axis A. Each of the rotary mechanisms 50 and the Y-drives 52 may include pneumatic, hydraulic, and/or electromechanical actuators, motors, linear drives, servo drives, solenoids, pistons/cylinders, and/or the like that also may include, for example, belts, chains, cables, ball screws, and/or any number of other devices for rotating and vertically translating the carriers 36.

Because the movable carriers 36 in the molten glass handling sub-system 414 are rotatable and vertically translatable, the need to extend or retract the carriers 36 along a direction perpendicular to the vertical translation direction (i.e., along the z-axis in FIG. 10) may not be necessary since the carriers 36 can be translated along the gantry 46 at different vertical positions with respect to each other. For example, in FIGS. 11 and 12, which show a molten glass handling sub-system 514 that includes two gantries 346*a*, 346*b*, each carrying a plurality of movable carriers 36, a first movable carrier 36*a* that is vertically extended away from its respective gantry 346*a* (extended along the y-axis) and a second movable carrier 36*b* that retracted towards its respective gantry 346*b* (retracted along the y-axis), relative to each other, can be transported along their respective gantries 346*a*, 346*b* (along the x-axis as depicted in FIG. 12) between the glass feeder 26 and forming machines 20 without interference.

Turning now to FIGS. 13-14, a molten glass handling sub-system 614 is illustrated that includes a dedicated path 54 for movable carriers 36 to travel between the glass feeder 26 and the forming machine(s) 20. The dedicated path 54 may be established by one or more chains, belts, tracks, cables, robots, or any other apparatus suitable for providing a carrier path. In this specific embodiment, the dedicated path 54 directs the movable carriers 36 in a figure-eight configuration in both a horizontal (x-z) plane and a vertical (x-y) plane. This allows the movable carriers 36 to move in both planes to position the transport cup(s) 32 in alignment with the feeder axis F of the glass feeder 26 for receiving a portion of molten glass 18 and to then transport the cup(s) 32 to a forming machine 20 associated with one loop of the figure-eight path to deliver a portion of molten glass 18 into blank molds 16 along blank mold loading axes A (FIG. 14), followed by returning the movable carrier 36 to the glass feeder 26 to again position the transport cup(s) 32 in alignment with the feeder axis F for receiving another portion of molten glass 18 and thereafter transporting the cup(s) 32 to a forming machine 20 associated with another loop of the figure-eight path 54 to deliver the portion of molten glass 18 into a blank mold 16 along the blank mold loading axis. FIG. 13 shows a top view of the figure-eight configuration of the path 54 oriented in an x-z plane with respect to a glass manufacturing system 610, and FIG. 14 shows a side elevational view of the same path 54 oriented in an x-y plane. It is contemplated that the path 54 may include other non-linear configurations, for example, an oval configuration.

With reference now to FIG. 15, a glass manufacturing system 710 is depicted that includes a molten glass handling sub-system 714 configured to provide portions of molten glass to a glass forming sub-system 712, which further includes a plurality of rotary blank mold carriers 56*a,b,c* that carry a plurality of blank molds 16. Also, in this embodiment, the molten glass handling system 714 includes a plurality of rotatable movable carriers 736 that can be interdigitated with one another such that the transport cup(s) 32 of each carrier 736 can be rotated to receive portions of molten glass 18 along a feeder axis F of the glass feeder 26 and to deliver the portions of molten glass 18 into blank molds 16 along blank mold loading axes A. Each rotary carrier 736 may be supported and/or coupled to the glass feeder 26 and/or an X-Y table 58 by way of an end pivot 60, which can be rotated using a servo motor and/or a gearbox (not shown) comprised as a component of the glass feeder 26 and/or the X-Y table 58.

If the rotatable movable carrier 736 is supported by an X-Y table 58, the X-Y table 58 can provide horizontal motion in the x-y plane for the carrier 736. The X-Y table 58 may include a motorized linear slide with the linear motion based in bearings, and are driven by a drive mechanism, for example a linear motor. The X-Y table 58 can be coupled to the glass feeder 26 and can tune the loading and unloading positions of the respective rotatable movable carrier 736 along with providing the transport cup 32 with the ability to track a rotary blank mold carrier 56 during unloading of the portion of molten glass 18. Additionally, the end pivot 60 may be vertically movable to adjust the loading and unloading height of the rotatable movable carrier 736, which may allow the transport cup 32 to dock with a respective blank mold 16 while unloading. In the embodiment shown in FIG. 15, each rotatable movable carrier 736 may be single-ended, where the pivot is coupled to a first end 64*a* of the carrier 736, and at least one transport cup 32 is provided disposed on an opposite second end 64*b*. In another embodiment, however, as shown in FIG. 16, each rotatable movable carrier 836 may be double-ended. Each carrier 836 may be supported and/or coupled to the glass feeder 26 and/or the X-Y table 58 by way of a central pivot 62*a,b,c*, which can be rotated using a servo motor and/or a gearbox (not shown) comprised as a component of the glass feeder 26 and/or the X-Y table 58. In the embodiment shown in FIG. 16, each rotatable movable carrier 836 may be double-ended, where each pivot 62*a,b,c* is respectively coupled to central portion of the carrier 836, and at least one transport cup 32 is provided disposed on opposite first and second ends 164*a*, 164*b*.

Turning now to FIG. 17, the glass manufacturing system 10 is shown being communicably coupled to a controller 66, which may comprise any suitable apparatus including an electronic processor or processing device 68, an electronic memory device 70 that is part of and/or accessible by the processing device 68, and a communications interface 72. The controller 66 controls equipment communicably coupled within the glass manufacturing system 10 to perform the method steps described herein. The controller 66 may control a combination of hardware (e.g. sensors, sub-controllers, etc.), software, and/or other components associated with transporting glass, among potentially other functionality.

The processing device 68 of the controller 66 may include any type of suitable electronic processing device(s), for example, a programmable microprocessor, a microcontroller, a central processing unit (CPU), an application specific integrated circuit (ASIC), and/or the like. The processing device(s) 68 is/(are) configured to process data and/or execute appropriate programming instructions for software, firmware, programs, applications, algorithms, scripts, etc., necessary to perform various functions of the controller 66. The memory device 70 may include random access memory (RAM), read only memory (ROM), hard disk(s), universe serial bus (USB) drive(s), memory card(s), or any type of suitable electronic memory means (e.g., non-transitory computer-readable medium with instructions stored thereon) and may store a variety of data. This includes software (e.g., code or logic), firmware, programs, applications, algorithms, scripts, etc., required to perform functions of the controller 66. In at least certain embodiments, the controller 66 may also include one or more components to enable a user to manually input certain data including, for example, process settings. More particularly, the controller 66 may include a user interface (not shown) such as, a touch screen, keypad, or keyboard through which a user may provide data or information relating to the glass manufacturing system 10. The communications interface 72 may be electrically connected to certain communication-supporting infrastructure (e.g., one or more known components/devices, for example, routers, modems, antennas, electromechanical ports, transceivers, etc.) to allow for the communication and exchange of data between the controller 66 and one or more other components of the system 10.

FIG. 18 illustrates an example of a method 100 for transporting molten glass through the glass manufacturing system 10 described herein, including its many variations. For purposes of illustration, the method 100 will be described in the context of the glass manufacturing system 10 described above and illustrated in FIG. 1. It will be appreciated, however, that the application of the present methodology is not meant to be limited solely to such an arrangement, but rather the method 100 may find application with any number of arrangements including the many variations described above in FIGS. 2-17 plus other arrangements not described (i.e., steps of method 100 may be performed by components of the glass manufacturing system 10 other than those described below, or arrangements of the glass manufacturing system 10 other than that described above).

The method 100 comprises a step 102 of receiving a discrete portion of molten glass 18 from the glass feeder 26 along the feeder axis F into at least one respective transport cup 32, which is supported by the movable carrier 36. In an example, receiving the portion of molten glass 18 includes positioning the movable carrier 36 so that the cavity 34 of the transport cup 32 is aligned with the feeder axis F and directly below the orifice 28 of the glass feeder 26. The glass feeder 26 dispenses the portion of molten glass 18, which falls and is received in the transport cup 32. When the movable carrier 36 includes multiple transport cups 32, receiving the portion of molten glass 18 in each cup may include adjusting and repositioning the movable carrier 36 so that each transport cup 32 can be positioned in alignment with the feeder axis F of the glass feeder 26 to receive its respective portion of molten glass 18. Alternately, if the glass feeder 26 includes multiple orifices 28, receiving the portion of molten glass 18 in each of the multiple transport cups 32 may call for positioning the movable carrier 36 under the glass feeder 26 so that each transport cup 32 is aligned with a feeder axis F of one of the multiple orifices 28 of the glass feeder 26. In this way, each transport cup 32 in the movable carrier 36 receives a portion of molten glass 18 from a respective orifice 28.

The method 100 also comprises a step 104 of transporting the movable carrier 36 to a forming machine 20 that includes a blank mold 20 having a respective blank mold loading axis A via the molten glass handling sub-system 14. The molten glass handling sub-system 14 may include a plurality of movable carriers 36. The movable carrier 36 is transported to a forming machine 20 by way of molten glass handling sub-system 14 along the gantry 46 or by other approaches (see, e.g., FIGS. 15-16). Transporting the movable carriers 36 may also include coordinating the position of the movable carrier 36 with respect to other movable carriers 36 within the molten glass handling sub-system 14 and/or adjusting the configuration of each respective movable carrier 36. Once at the forming machine, the movable carrier is positioned so that the transport cup 32 is located above its respective blank mold 16 in alignment with the blank mold loading axis A of the blank mold 16.

The method 100 further comprises a step 106 of dispensing the portion of molten glass 18 from the transport cup 32 and into the blank mold 16 along the blank mold loading axis A. Dispensing the portion of molten glass 18 may include opening the cup opener 33, which causes the portion of molten glass 18 to drop into the blank mold 16. In other instances, the movable carrier 36 and the transport cup 32 may be inverted to dispense the portion of molten glass 18. The method 100 also comprises a step 108 of returning the movable carrier 36 to glass feeder 26 and positioning the transport cup 32 into alignment with the feeder axis F for reloading the cup 32 with another portion of molten glass 18.

There thus has been disclosed an apparatus and method for transporting molten glass. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A glass manufacturing system, comprising:
a glass forming sub-system, including:
    a plurality of forming machines, each including a blank mold having a blank mold loading axis; and
a molten glass handling sub-system including:
    a glass feeder to feed molten glass along a feeder axis;
    a transport cup to receive molten glass along the feeder axis;
    a movable carrier to support the transport cup and carry the transport cup away from the feeder axis to the blank mold loading axis; and
    a plurality of adjacent gantries, each carrying at least two movable carriers and being configured to move the at least two movable carriers back and forth from the glass feeder to the plurality of forming machines of the glass forming sub-system.

2. The system set forth in claim 1, wherein the transport cup comprises at least one of graphite, graphene, platinum, boron nitride, aluminum nitride, silicon carbide, or beryllium oxide.

3. The system set forth in claim 1, wherein the at least two movable carriers of the molten glass handling sub-system support a plurality of transport cups, each of which is carried on a respective movable carrier, and wherein the movable carriers of the plurality of movable carriers move independently of one another.

4. The system set forth in claim 1, wherein the at least two movable carriers include a cooling medium configured to provide cooling.

5. The system set forth in claim 1, wherein the plurality of adjacent gantries includes a plurality of vertically adjacent gantries, each of the plurality of vertically adjacent gantries carrying the at least two movable carriers and being configured to move the at least two movable carriers back and forth from the glass feeder to the plurality of forming machines.

6. The system set forth in claim 1, further comprising:
a cup treatment device including:
    a treatment application device; and
    a nozzle coupled to the treatment application device.

7. The system set forth in claim 1, wherein the plurality of adjacent gantries includes a plurality of laterally adjacent gantries, each of the plurality of laterally adjacent gantries carrying at least two movable carriers, which are pivotably movable, and being configured to move the at least two movable carriers back and forth from the glass feeder to the plurality of forming machines.

8. The system set forth in claim 1, wherein the plurality of adjacent gantries includes a plurality of laterally adjacent gantries, each of the plurality of laterally adjacent gantries carrying at least two movable carriers, which are translatable, and being configured to move the at least two movable carriers back and forth from the glass feeder to the plurality of forming machines.

9. The system set forth in claim 8, wherein the at least two movable carriers on each of the plurality of laterally adjacent gantries are translatable in a horizontal plane.

10. The system set forth in claim 8, wherein the at least two movable carriers on each of the plurality of laterally adjacent gantries are translatable in a vertical plane.

11. The system set forth in claim 8, wherein the at least two movable carriers on each of the plurality of laterally adjacent gantries are translatable in at least one of an x-y plane, a y-z plane, or an x-z plane.

12. The system set forth in claim 1, wherein the glass forming sub-system also includes a plurality of forming machines, and wherein the plurality of adjacent gantries are laterally adjacent.

13. The system set forth in claim 1, wherein the glass forming sub-system also includes a plurality of forming machines, and wherein the molten glass handling sub-system further includes a dedicated path for carrying the movable carrier back and forth from the glass feeder over top of the plurality of forming machines.

14. The system set forth in claim 13, wherein the dedicated path is configured in an oval or figure eight layout in at least one of a horizontal or a vertical arrangement.

15. The system set forth in claim 1, wherein the transport cup includes a sleeve having an open upper end that receive the molten glass, and a cup opener disposed under the sleeve to retain the molten glass in the transport cup and to release the molten glass from the transport cup.

16. The system set forth in claim 15, wherein the sleeve and the cup opener carries a heat-resistant material to contact the molten glass and including at least one of graphite, graphene, platinum, boron nitride, aluminum nitride, silicon carbide, or beryllium oxide.

17. A method for transporting molten glass, comprising:
receiving molten glass from a glass feeder along a feeder axis into a first transport cup, wherein the first transport cup is supported by a first movable carrier, and the first movable carrier is supported by a first gantry that is configured to move the first movable carrier back and forth from the glass feeder to a plurality of forming machines;
transporting the first movable carrier to bring the first transport cup over a first blank mold having a first blank mold loading axis;
receiving molten glass from a glass feeder along a feeder axis into a second transport cup, wherein the second transport cup is supported by a second movable carrier, and the second movable carrier is supported by a second gantry that is adjacent to the first gantry and is configured to move the second movable carrier back and forth from the glass feeder to the plurality of forming machines;

dispensing the molten glass from the first transport cup into the first blank mold along the first blank mold loading axis;

transporting the second movable carrier to bring the second transport cup over a second blank mold having a second blank mold loading axis;

returning the first movable carrier to the glass feeder for reloading the first transport cup;

dispensing the molten glass from the second transport cup into the second blank mold along the second blank mold loading axis; and returning the second movable carrier to the glass feeder for reloading the second transport cup.

\* \* \* \* \*